US008884450B2

(12) United States Patent
Tsakiris et al.

(10) Patent No.: US 8,884,450 B2
(45) Date of Patent: Nov. 11, 2014

(54) STARTER HAVING ENGAGEMENT DETECTION FUNCTION

(75) Inventors: Apostolos Tsakiris, Ludwigsburg (DE); Markus Roessle, Stuttgart (DE); Juergen Gross, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 13/519,619

(22) PCT Filed: Nov. 23, 2010

(86) PCT No.: PCT/EP2010/068020
§ 371 (c)(1), (2), (4) Date: Oct. 12, 2012

(87) PCT Pub. No.: WO2011/080010
PCT Pub. Date: Jul. 7, 2011

(65) Prior Publication Data

US 2013/0026767 A1 Jan. 31, 2013

(30) Foreign Application Priority Data

Dec. 29, 2009 (DE) ........................ 10 2009 055 371

(51) Int. Cl.
*G01M 15/00* (2006.01)
*H01H 51/06* (2006.01)
*F02N 19/00* (2010.01)
*F02N 11/08* (2006.01)

(52) U.S. Cl.
CPC ........... *F02N 11/0851* (2013.01); *F02N 19/005* (2013.01); *F02N 11/0855* (2013.01); *H01H 51/065* (2013.01); *F02N 2200/047* (2013.01); *F02N 2250/04* (2013.01); *F02N 2200/065* (2013.01)
USPC .................... 290/38 C; 290/38 R; 73/114.59; 123/179.3

(58) Field of Classification Search
CPC ....... F02N 11/87; F02N 11/855; F02N 15/67; F02N 11/851; F02N 2200/47
USPC ..................................... 290/38 C; 73/114.59
See application file for complete search history.

(56) References Cited

U.S. PATENT DOCUMENTS 5,222,401 A * 6/1993 Fasola et al. .................... 74/7 A
5,970,937 A 10/1999 Casellato et al.
6,323,562 B1 11/2001 Renner et al.

(Continued)

FOREIGN PATENT DOCUMENTS

DE 4242432 6/1994
JP 2001349269 12/2001

(Continued)

OTHER PUBLICATIONS

PCT/EP2010/068020 International Search Report dated Feb. 21, 2011 (Translation and Original, 6 pages).

*Primary Examiner* — Michael Zarroli
(74) *Attorney, Agent, or Firm* — Michael Best & Friedrich LLP

(57) ABSTRACT

The invention relates to a starter (100), to a device for starting a starter motor, to a device for detecting an engaged state of a starter pinion, to a method for starting a starter motor, to a method for detecting an engaged state of a pinion (101) in a corresponding gearwheel, to a computer program and to a computer program product, wherein the method for detecting an engaged state of a pinion (101) in a corresponding gearwheel, in particular an engaged state of a starter pinion in a gear rim of a starter (100), comprises applying a current to a starter relay (110) for switching the pinion (101) and detecting at least one current flow parameter of the current flow, wherein the detected current flow parameter is set in relation to potential pinion positions and a pinion position associated with the detected current flow parameter is selected and is thus detected.

16 Claims, 4 Drawing Sheets

(56) References Cited

U.S. PATENT DOCUMENTS

| | | | | |
|---|---|---|---|---|
| 6,651,603 | B2 * | 11/2003 | Osada et al. | 123/179.3 |
| 7,373,908 | B2 * | 5/2008 | Rizoulis et al. | 123/179.25 |
| 2007/0139047 | A1 | 6/2007 | Ostman | |
| 2010/0251852 | A1 * | 10/2010 | Murata et al. | 74/7 A |
| 2011/0184626 | A1 * | 7/2011 | Mauritz et al. | 701/102 |
| 2011/0308490 | A1 * | 12/2011 | Hartmann et al. | 123/179.4 |

FOREIGN PATENT DOCUMENTS

| | | |
|---|---|---|
| JP | 2003214305 | 7/2003 |
| WO | 03029643 | 4/2003 |
| WO | 2010015450 | 2/2010 |

* cited by examiner

STARTER HAVING ENGAGEMENT DETECTION FUNCTION

BACKGROUND OF THE INVENTION

The invention relates to a method for detecting a state of engagement of a pinion with a corresponding gearwheel, in particular a state of engagement of a starter pinion with a starter.

The invention also relates to a method for starting a starter motor.

Furthermore, the invention relates to a computer program.

The invention also relates to a computer program product.

Moreover, the invention relates to a device for detecting a state of engagement of a pinion with a corresponding gearwheel, in particular a state of engagement of a starter pinion with a starter.

The invention likewise relates to a device for starting a starter motor.

Last but not least, the invention relates to a starter having a pinion which is to be engaged.

The invention is based on a starter having an associated relay which controls engagement of a pinion in a corresponding toothing arrangement. In particular, the invention is based on start/stop systems, in particular start/stop systems which have an expanded functionality and in which engagement occurs in an internal combustion engine which is coasting to a standstill, with subsequent positioning of the crankshaft. In such solutions it is necessary to ensure that the pinion is engaged before the starter turns.

In known solutions, the pinion position is not detected but instead waiting occurs for a predetermined time period in which engagement of the pinion has taken place with a high degree of probability. In this context it is ensured that the starter pinion has engaged in the ring gear of the internal combustion engine before the starter motor turns, by virtue of the fact that a certain lag time is maintained between the energization of the relay and that of the starter. This lag time must be selected such that under all circumstances the starter does not begin to turn before the pinion is securely engaged in the ring gear. Failure to engage, loud noises or even aborted starts are the result of excessively early turning. However, in most cases this configuration takes into account a time loss which leads to prolonged starting times, and in the case of engagement in the internal combustion engine which is coasting to a standstill and has subsequent positioning of the crankshaft leads to intermediate deactivation and/or swinging back of the internal combustion engine.

EP 960 276 B1 discloses a circuit arrangement for an engagement relay, which engages two gearwheels, of a starter device of an internal combustion engine, having a switching element which, after a first time period before the two gearwheels are brought into engagement with one another, reduces a relay current to a specific current value during a second time period. The switching element is embodied as an open-loop and closed-loop control device which increases the relay current to a predetermined value in a third time period, wherein the third time period starts when the one gearwheel reaches the other.

SUMMARY OF THE INVENTION

The methods according to the invention, the computer program according to the invention, the computer program product according to the invention, the devices according to the invention and the starter according to the invention have, among other advantages, the advantage that the detection of the pinion position permits faster turning of the starter since there is no need to wait for a fixed time period. Particularly in the case of start/stop systems with an expanded functionality, such as engagement in the internal combustion engine which is coasting to a standstill and has subsequent positioning of the crankshaft, it is advantageous, for reasons of comfort and service life, to start positioning the internal combustion engine as quickly as possible after the engagement process. In this way it is possible to prevent or at least minimize intermediate deactivation of the internal combustion engine and/or swinging back. According to the invention, of at least one energization parameter of the energization is sensed, the sensed energization parameter is placed in relation to possible pinion positions and an associated pinion position with respect to the sensed energization parameter is selected and therefore detected. The detection of the pinion position ensures that starting does not take place too early, that is to say before the complete engagement of the pinion, and a malfunction with loud noises or aborted starting due to incorrect engagement does not occur. Since an energization parameter is sensed for the purpose of detection, there is no need for an additional sensor which, for example, visually senses the position, which also minimizes a risk of faults. By reference to a repeatedly recurring typical characteristic curve profile of the energization parameter it is possible to unambiguously infer the position of the pinion, with the result that failure during the engagement is reliably prevented.

It is advantageous that a plurality of pinion positions are stored in a data memory in relation to energization parameters which can be sensed. In particular, various discrete energization parameters and associated pinion positions are stored. In this way, not every intermediate position between pinion positions which are relevant for the engagement is recorded, as a result of which there is a reduction in memory space and a computational speed or processing speed is optimized. Accordingly, in other embodiments further positions, for example of an armature, of a fork lever or the like, are also stored, with the result that a plurality of positions of different components can be detected. Since the movement of the pinion is dependent on the positions of other components, it is therefore possible to implement redundancy which further increases the detection accuracy and therefore prevents incorrect detections.

It is particularly advantageous that the sensed energization parameter is placed in relation to possible pinion positions and an associated pinion position is selected with respect to the sensed energization parameter, and therefore detected. Since the pinion positions are assigned, in a memory, to corresponding characteristic curves of various energization parameters, by sensing the energization parameter it is possible to reliably determine and detect a pinion position. For example, a sequence of current rise-current fall-current rise-current fall-current rise-current fall can be assigned, as a profile of an energization parameter embodied as a current, to a pinion position pinion starts to engage in ring gear. Other profiles or sequences are assigned to further positions. In addition to the sequence of current rise or current fall, a relationship is dependent as a function of the gradient of a profile curve or on a magnitude of a sensed energization parameter. For example, a current fall can also be assigned to a corresponding current level of a specific pinion position.

Another advantage of the present invention is that a plurality of pinion positions are stored in a data memory in relation to energization parameters which can be sensed. The pinion can assume a plurality of positions in a starter, in particular a non-engaged position, an engaged position and a position of the start and/or end of engagement. In one embodiment of the invention, a plurality of positions are assigned to corresponding energization parameter profiles, so that not only the position of the pinion which is relevant for the engagement but also further positions can be detected. It is therefore possible, by monitoring further pinion positions, to avoid further incorrect switching operations and to initiate maintenance in good time.

In one particular preferred embodiment there is provision that the sensing comprises the sensing of a chronological profile of the energization parameter. The energization parameter changes over time during the engagement process. As a result, sensing depends not only on specific current values but also on a sequence of current values over time. A certain position of the pinion cannot be inferred solely from a current drop. Instead, the energization level and the preceding sequence of the energization parameter over time are relevant here, in particular also the change in the energization parameter over time. As a result of the relationship of the energization parameter with time, a higher level of reliability of the detection probability is provided.

Furthermore, it is advantageous that a differentiated profile is generated from the sensed chronological profile by means of differentiation. In particular the change in the profile of the energization parameter, i.e. the gradient of the profile, is particularly advantageous for the detection of a pinion position. It is therefore possible to define boundaries for a gradient which provide exclusion via the pinion positions. If a sensed energization parameter or the gradient thereof is not within the boundaries, there is, for example, no engagement switching time. In this way, a malfunction due to fluctuations in voltage or other influences which do not relate to the engagement process can be avoided. Accordingly, tolerance values are provided around the limiting values, renewed measurement or time-sequence-controlled engagement being carried out, for example, when said tolerance values are reached.

In particular, it is advantageous that various sections of the profile are classified in order to generate a profile with discrete sections with corresponding jumps. The classification takes place, for example, as current rise, current fall and constant current. Subclassifications are also defined, for example current rise to a high current level, current rise to a low current level, strong current rise with a large gradient, small current rise with a low gradient etc. On the basis of this classification it is possible to assign unambiguous pinion positions, for example in the case of stops of the pinion or in the initial position or final position thereof. In this way, only the positions of the pinion which are relevant for starting are assigned, which provides a saving in terms of computing capacity and brings about a better performance.

In addition it is advantageous that the relation comprises a comparison of the profile with a corresponding predefined characteristic curve. Characteristic curves for various energization parameters have been obtained from various trials. Said curves are correspondingly stored or saved together to form a characteristic curve, if appropriate with a tolerance range. The characteristic curve storage is not rigid in advantageous embodiments but it is instead implemented in a self-learning fashion so that the characteristic curve is regularly adapted on the basis of further empirical values and measured values. In particular even if characteristic curves change as a function of a service life, this change is taken into account in advantageous embodiments.

In particular it is advantageous that a pinion position profile is assigned to the characteristic curve. A corresponding pinion position profile is assigned to the characteristic curve or the characteristic curves with the result that each point on the characteristic curve corresponds to a pinion position. Inflection points of the characteristic curve, which stand for correspondingly relevant pinion positions, are of particular importance here. The points on the characteristic curve are only theoretically representative of a certain pinion positions here. Instead, regions of points are assigned to a pinion position region. In this way less computing power is necessary for the determination process since only certain discrete pinion positions have to be detected for the starting process.

A further preferred embodiment of the present invention provides that at least one further parameter selected from the group comprising time, current strength, voltage strength, current fluctuation, voltage fluctuation and the like is taken into account in order to determine the pinion position. In particular, the current can be sensed simply and precisely, for example by means of the current strength, and the voltage can be sensed simply and precisely, for example by means of the level of the voltage, without complicated sensors being necessary. Corresponding connections are provided, with the result that the method according to the invention can also be easily retrofitted for existing starter systems.

Furthermore, it is advantageous that in a method for starting a starter motor, a method according to the invention for detecting a state of engagement of a pinion with a corresponding gearwheel, in particular a state of engagement of a starter pinion with a starter, is carried out, and further steps such as starting or positioning the crankshaft are carried out as a function of the detected position of the pinion, in particular after engagement of the pinion. The detection of the pinion position, in particular of the pinion position which is the optimum one for starting, permits the relay to be switched, that is to say the starting process to be begun, without a delay, which brings about an increase in effectiveness, in particular in start/stop systems.

The methods can advantageously be implemented as a computer program and/or computer program product. They include all computing units, in particular also integrated circuits such as FPGAs (Field Programmable Gate Arrays), ASICs (Application Specific Integrated Circuits), ASSPs (Application Specific Standard Products), DSPs (Digital Signal Processors) and the like as well as hard-wired computing modules. The method can be quickly and easily retrofitted by means of corresponding embodiments.

The method can particularly advantageously be implemented in suitable devices with means for carrying out the method. An advantageous embodiment of the invention therefore provides that in a device for detecting a state of engagement of a pinion with a corresponding gearwheel, in particular a state of engagement of a starter pinion with a starter, there is provision that an energization section for energizing a starter relay in order to switch the pinion and a sensing section for sensing at least one energization parameter of the energization are included. Particularly advantageously a control section is provided in order to form, on the basis of the sensed energization parameter, a relationship with possible pinion positions and to select an associated pinion position for the sensed energization parameter, and therefore to detect the pinion position. The individual sections can be embodied in different ways. For example, the control section can comprise control logics or control modules on which, for example, the method is implemented by software or as a circuit. The method can easily be implemented with a corresponding device.

In order to use the method in a starter, one advantageous embodiment of the invention provides that in a device for starting a starter motor there is provision that a device for detecting a state of engagement of a pinion with a corresponding gearwheel, in particular a state of engagement of a starter pinion with a starter, is provided. The device comprises, in accordance with the above, an energization section for energizing a starter relay in order to switch the pinion, and a sensing section for sensing at least one energization parameter of the energization, wherein a control section is provided in order to form, on the basis of the sensed energization parameter, a relationship with possible pinion positions and to select an associated pinion position for the sensed energization parameter, and therefore to detect the pinion position. In addition, the device according to the invention also comprises an actuator for starting the starter motor, which actuator brings about the starting as a function of the detected position of the pinion, in particular after engagement of the pinion. The starting is advantageously carried out by energizing a corresponding relay.

A further preferred embodiment of the invention therefore also provides that in a starter having a pinion which is to be engaged, a device according to the invention for starting a starter motor is provided. In this way, starters which can be engaged quickly and which are optimized, in particular, for a start/stop function can be implemented.

BRIEF DESCRIPTION OF THE DRAWINGS

Exemplary embodiments of the invention are illustrated in the drawings and explained in more detail in the following description. In the drawings.

DETAILED DESCRIPTION

Figure 1:
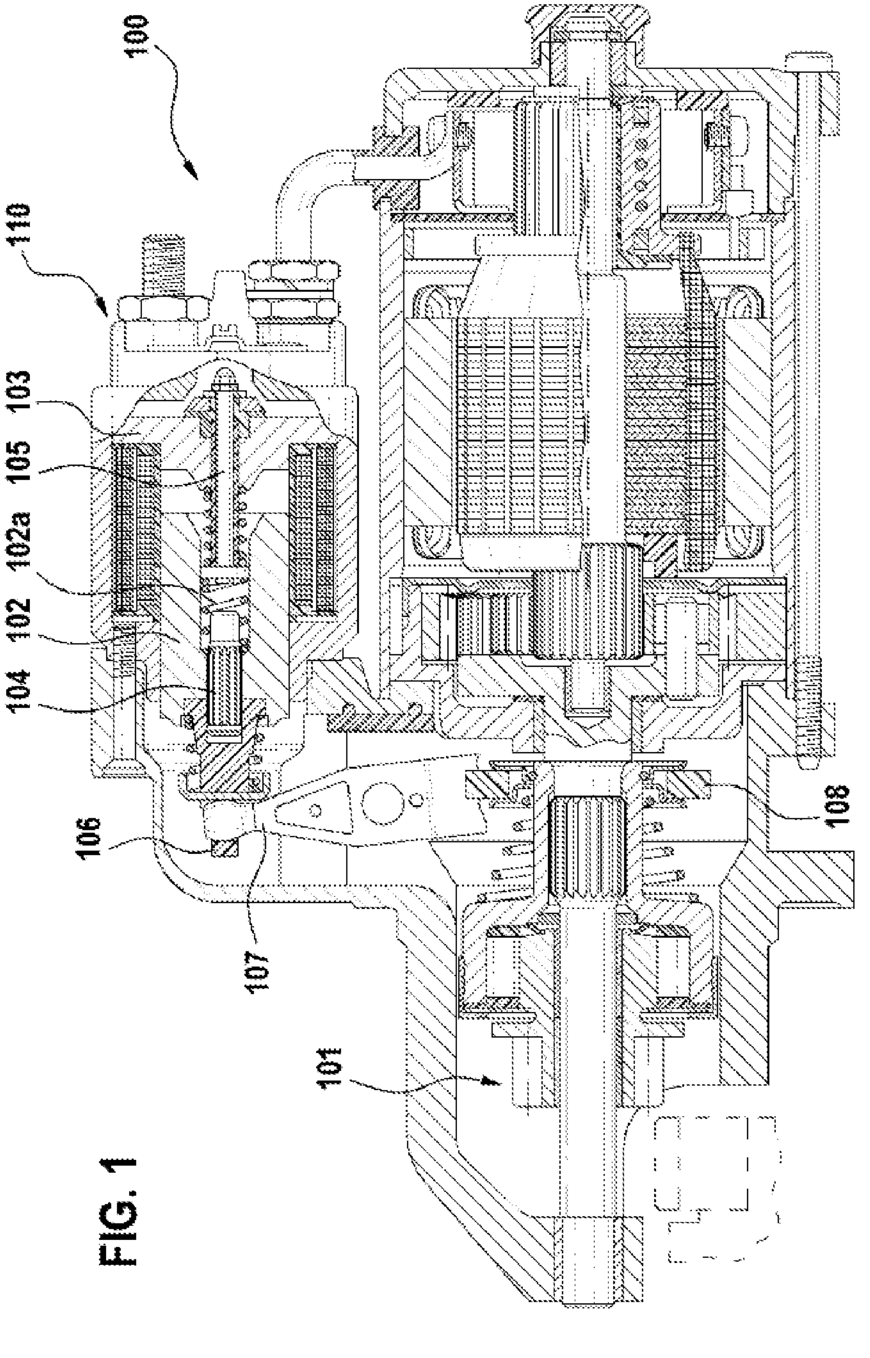
FIG. 1 is a schematic perspective view of a section through a starter 100 with a pinion 101.

FIG. 1 is a schematic perspective view of a section through a starter 100 with a pinion 101. The pinion 101 is switched by means of a relay 110, so that, in the event of corresponding energization, the pinion 101 engages in a ring gear of the starter 100. The engagement occurs roughly as follows: the relay—also press-in relay —110 has a bolt which is an electric contact and which is connected to the positive pole of an electric starter battery, which is not illustrated here. This bolt is led through a relay cover. This relay cover closes off a relay housing, which is attached to the drive end plate by means of a plurality of attachment elements (screws). Furthermore, a draw-in winding or an engagement winding ENW and what is referred to as a holding winding HW are arranged in the engagement relay 110. The draw-in winding ENW and the holding winding HW both respectively in the switched-on state give rise to an electromagnetic field which flows through the relay housing (made of electromagnetically conductive material), a linearly movable armature 102 and an armature return 103. The armature 102 has a pushrod 104, which is moved in the direction of a switching bolt 105 when the armature 102 is drawn in linearly. With this movement of the pushrod 104 with respect to the switching bolt 105, the latter is moved out of its position of rest in the direction of two contacts, with the result that a contact bridge which is attached to the end of the switching bolt 105 which is positioned on the contacts connects both contacts electrically to one another. As a result, electrical power is conducted from the bolt via the contact bridge to the current feed and therefore to the carbon brushes. The drive motor or starter 100 is energized in the process.

The engagement relay 110 or the armature 102 also has the function of moving, with a pulling element 106, a lever 107 which is arranged in a rotationally movable fashion the drive end plate. This lever 107, usually embodied as a fork lever, engages, with two "prongs" (not illustrated here) on its outer circumference around two in order to move a driver ring 108, clamped in between the latter, toward the freewheel counter to the resistance of a spring, and as a result to engage the starter pinion 101 in the ring gear.

Figure 2:
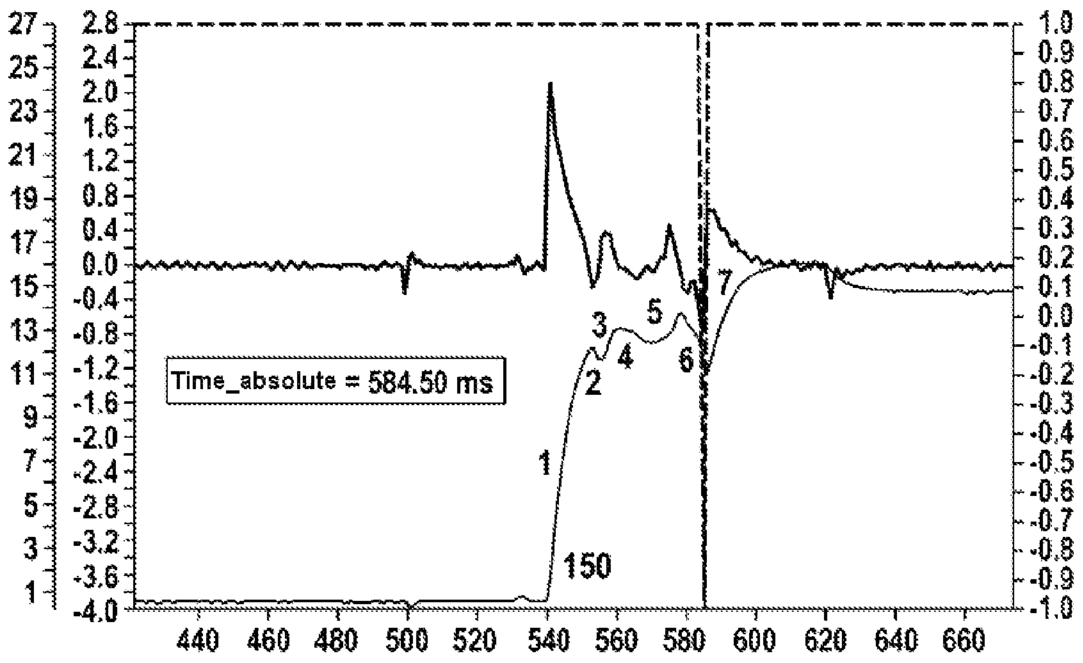
FIG. 2 is a schematic diagram of two profiles of a sensed energization parameter plotted over time in an engagement process.
Figure 3:
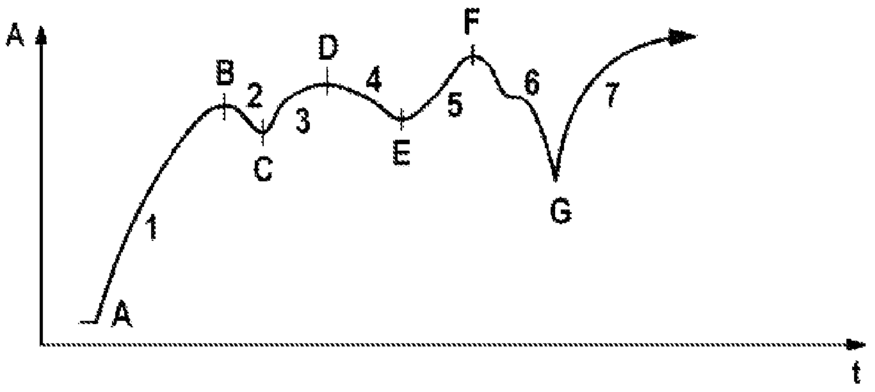
FIG. 3 is a schematic diagram of a characteristic-curve-like profile of one of the energization parameters according to FIG. 2.

During the engagement process described above, with the various steps at least one energization parameter of the relay 110, in particular the relay current and the relay voltage, changes. In FIG. 2, two profiles of an energization parameter are represented plotted against the time. The energization parameter according to FIG. 2 is the current profile of the relay 110 during energization of the engagement winding. One profile represents the sensed current profile, which is also schematically represented in FIG. 3. The other profile represents the first derivation of the current profile. Various steps of the engagement process can be assigned to the current profile. The engagement process is roughly divided up into the following steps. In an initial state A, all the components which are involved in the engagement process are at rest. When energization occurs, a corresponding current rise 1 is found to occur. After a certain time, the armature 102 starts to move owing to the energization at B, and in the process it compresses the armature restoring spring 102*a*. A current drop 2 is found to occur here. In addition, as a result of the movement of the armature 102 and therefore of the associated fork lever 107, the driver 108 impacts on the fork lever 107—C—wherein a current rise 3 can be observed. Subsequently, the pinion 101—D—moves, initiated by the driver 108, as a result of which in turn a current drop 4 can be observed. The current drop 4 can be observed until the pinion 101 impacts on the ring gear—E—, and the movement initially stops. In this context, a current rise 5 can be observed. After the pinion 101 impacts on the ring gear, the pinion 101 moves into the ring gear—F—, wherein a current drop 6 can be observed. At the end of the engagement, the armature 102 impacts on a stop—G—which limits the engagement process. Correspondingly, a renewed current rise 7 is then found to occur. This characterizing profile occurs to a greater or lesser degree during all engagement processes. In FIG. 2, the first derivation of the current profile is given in addition to the current profile. On the basis of the two profiles, a simple assignment to the various pinion positions is possible.

Figure 4:
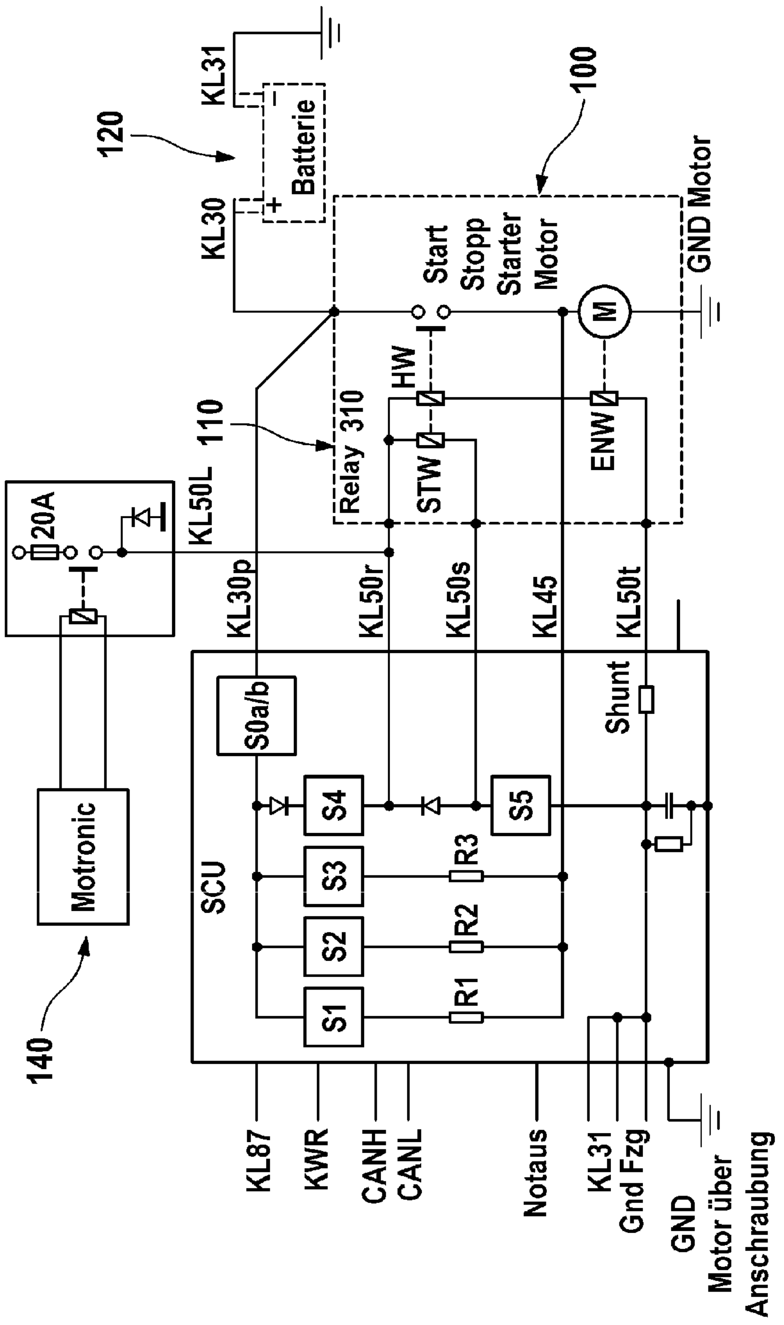
FIG. 4 is a schematic circuit diagram of a starter control unit.

FIG. 4 is a schematic view of a circuit diagram. According to the circuit diagram, a starter or starter motor 100 is provided with a start/stop function. The starter 100 also has the relay 110. On one side, the relay 110 is connected to the positive pole of a battery 130 by means of terminals KL30. The negative pole of the battery 130 is grounded by means of the terminal KL31. On another side, the starter 100 is coupled by the relay 110 to a control unit—Starter Control Unit SCU. The control unit SCU has various inputs and outputs, including KL87, KWR, CANH, CANL, Emergency off, KL31, GND vehicle, GND, KL30*p*, KL50*r*, KL50*s*, KL45, KL50*t*. The control unit is grounded by means of a screwed connection to the motor. KL31 is the battery ground. KL30 therefore denotes a supply of the battery with a voltage of +12V. KL50 denotes the direct energization of the holding winding HW and of the engagement winding ENW from the motronic unit. KL30*p* denotes the connection to the +12V battery supply in the control unit SCU. KL50*r* denotes the connection to the +12V supply to the holding winding HW, the engagement winding ENW and the switching winding STW. KL50*s* denotes the connection to the ground of the switching winding STW. KL45 denotes the connection to the +12V battery supply from the control unit SCU, that is to say starter energization when the switching elements S1 to S3 switch, the latter being switched together or individually. KL50*t* denotes the connection to the ground at the holding winding HW and the engagement winding ENW. S0 denotes a main switch of the control unit SCU. By this means, the control unit SCU, which is also referred to as a power component, is switched. S1-S3 denote switches or switching elements for switching the starter current. For this purpose, the resistances R1 to R3 are connected in parallel. The switching element S4 serves to switch the energization of the holding winding HW and of the engagement winding ENW by means of the control unit SCU. The switching element S5 switches the energization of the switching winding STW. As a result, the various switching elements S1-S4, Süa/b, a shunt and other electrical components such as diodes and the like are contained internally. The control unit SCU is connected via the terminal KL30*p* to a common node by the starter to the positive pole of the battery 120. Via the terminals KL50*r*, KL50*s*, KL45 and KL50*t*, the control unit SCU is connected to the relay 110 of the starter 100. In addition, a motronic unit 140 is provided which is coupled via a terminal KL50L by the line to the terminal KL50*r* between the control unit SCU and the relay 110. The control unit SCU, the motronic 140 and the relay 110 are constructed as follows and function as follows. A power supply of the control unit SCU, that is to say the logic component, is implemented by means of the terminal KL87. KWR denotes a crankshaft reference signal for, inter alia, positioning the crankshaft. CANH denotes a CAN high signal and CANL a CAN low signal. These signals function as signals for a BUS system (controller area network) for performing further control.

Figure 5:
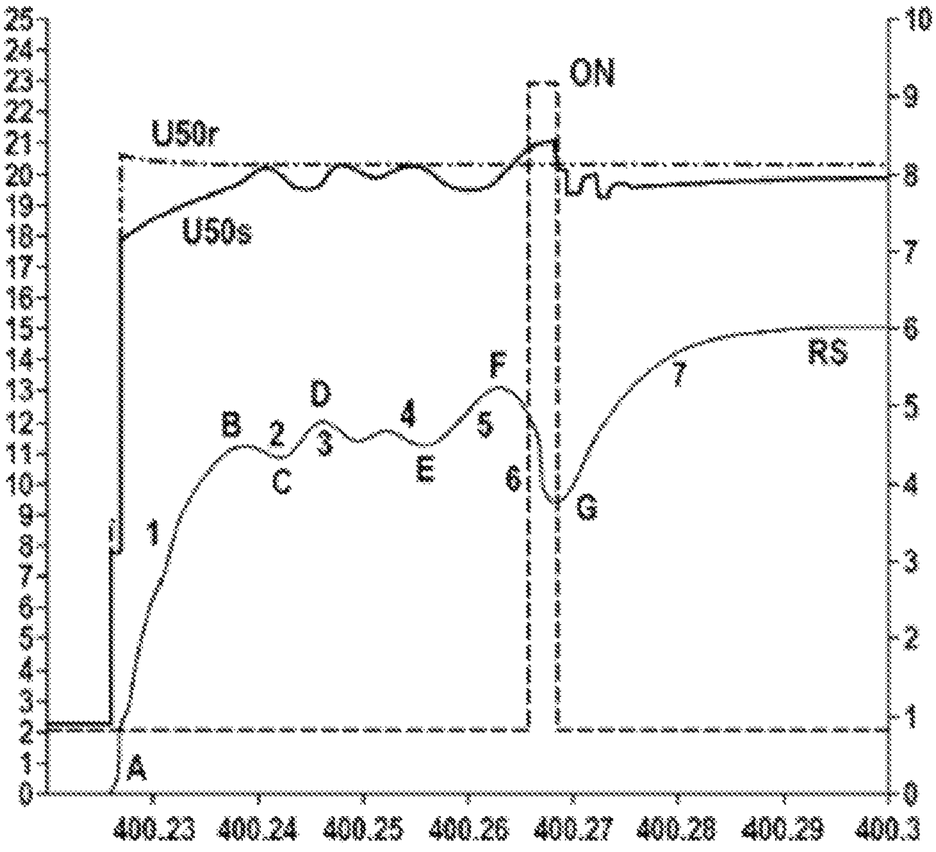
FIG. 5 is a schematic diagram of a plurality of profiles of a sensed energization parameter plotted over time during an engagement process.

A voltage can be sensed, alternatively or in combination, as further energization parameters. The corresponding profiles are illustrated in FIG. 5. FIG. 5 shows the corresponding profiles. When the engagement winding is energized and the resulting movement sequence of the relay armature 102 occurs, a relay current (RS in FIG. 2 and FIG. 5) which changes over time is produced. The profile in FIG. 2 and that in FIG. 5 are similar. The changing relay current in turn brings about a change in the magnetic field of the coil of the engagement winding through which the current flows. The change in the magnetic field of the engagement winding ENW in turn induces a voltage in the switching winding STW, which voltage can be observed at the terminal KL50*s* as U50*s*. The unenergized switching winding STW is therefore used as a measuring sensor. During the chronological sequence, the voltage U50*s* exceeds the voltage U50*r* at the terminal KL50*r* once. At this time, engagement of the pinion has certainly occurred. This process is illustrated by the square wave curve ON. In order to reliably detect the engagement, the voltage U50*r* is therefore subtracted from the voltage U50*s*. If the value is above a corresponding limiting value and if a current rise occurs thereafter, it is therefore the case when this condition is met that the pinion has engaged. In addition, a safety redundancy can be taken into account. This may have as condition the fact that a predetermined time limit after the beginning of the energization of the relay is exceeded. The time limit can be adapted in accordance with earlier empirical values, for example in a self-learning adaptation process.

The invention claimed is:

1. A method for detecting a state of engagement of a pinion with a corresponding gearwheel, the method comprising:

energizing of a starter relay in order to switch the pinion, and sensing of at least one energization parameter of the energization of the starter relay, wherein the sensed energization parameter relates pinion positions including: 1) the pinion moving while out of contact with the ring gear, 2) the pinion impacting the ring gear, 3) the pinion moving into the ring gear into engagement therewith, and 4) the pinion not moving while out of contact with the ring gear, and wherein one of the pinion positions is selected based on the sensed energization parameter, and therefore detected.

2. The method as claimed in claim 1, wherein the pinion positions are stored in a data memory in relation to energization parameters which can be sensed.

3. The method as claimed in claim 1, wherein the sensing comprises the sensing of a chronological profile of the energization parameter.

4. The method as claimed in claim 3, wherein a differentiated profile is generated from the sensed chronological profile by means of differentiation.

5. The method as claimed in claim 3, wherein various sections of the profile are classified in order to generate a profile with discrete sections (A-B, B-C, C-D, D-E, E-F, F-G) with corresponding jumps in the energization parameter.

6. The method as claimed in claim 3, including comparing the chonological profile with a corresponding predefined characteristic curve.

7. The method as claimed in claim 6, wherein a pinion position profile is assigned to the characteristic curve.

8. A method for starting a starter motor, the method comprising:

detecting a state of engagement of a pinion with a corresponding gearwheel as claimed in claim 1, and at least one of starting the starter motor based on the detected position of the pinion and positioning the crankshaft based on the detected position of the pinion.

9. A computer program comprising program code means for carrying out all the steps as claimed in claim 1 when the program is run by a computer.

10. A computer program product comprising program code means which are stored on a computer-readable medium in order to perform the method as claimed in claim 1 when the program product runs in a computer.

11. A method for detecting a state of engagement of a pinion with a corresponding gearwheel, the method comprising energizing of a starter relay in order to switch the pinion, and sensing of at least one energization parameter of the energization of the starter relay, wherein the sensed energization parameter is related to possible pinion positions and an associated pinion position is selected with respect to the sensed energization parameter, and therefore detected, and wherein at least one further parameter selected from the group comprising time, current strength, voltage strength, current fluctuation and voltage fluctuation is taken into account in order to determine the pinion position.

12. A device for detecting a state of engagement of a starter pinion with a corresponding ring gear of a starter, the device comprising:

an energization section for energizing a starter relay in order to switch the pinion, and a sensing section for sensing a chronological profile of at least one energization parameter of the energization of the starter relay, wherein a control section is provided in order to form, on the basis of the chronological profile of the sensed energization parameter, a relationship with possible pinion positions and to select an associated pinion position for the sensed energization parameter, and therefore to detect the pinion position.

13. A starter having a pinion which is to be engaged, wherein a device for starting a starter motor as claimed in claim 12 is provided.

14. A device for starting a starter motor, wherein a device for detecting a state of engagement of the starter pinion with the ring gear of the starter motor is provided, the device for detecting a state of engagement comprising:

an energization section for energizing a starter relay in order to switch the starter pinion, and a sensing section for sensing at least one energization parameter of the energization of the starter relay, wherein a control section is provided in order to form, on the basis of the sensed energization parameter, a relationship with possible pinion positions and to select an associated pinion position for the sensed energization parameter, and therefore to detect the starter pinion position, and in addition an actuator is provided for starting the starter motor, which actuator brings about the starting as a function of the detected position of the starter pinion, wherein the control section is configured so that the selected associated pinion position comprises one of 1) the pinion moving while out of contact with the ring gear, 2) the pinion impacting the ring gear, 3) the pinion moving into the ring gear into engagement therewith, and 4) the pinion not moving while out of contact with the ring gear, and wherein each of the corresponding pinion positions is selected depending on the sensed energization parameter.

15. A method for detecting a state of engagement of a pinion with a corresponding gearwheel, the method comprising energizing of a starter relay in order to switch the pinion, the energizing providing a change in magnetic field of an engagement winding, and sensing of at least one energization parameter of the energization, wherein the magnetic field of the engagement winding induces a voltage in an unenergized switching winding that functions as a sensor, wherein the induced voltage of the switching winding relates to possible pinion positions and detecting that the pinion is engaged is response to a voltage difference in the switching winding.

16. A device for starting a starter motor wherein a device for detecting a state of engagement of the starter pinion with the ring gear of the starter motor is provided, the device for detecting a state of engagement comprising:

an energization section for energizing an engagement winding of a starter relay in order to switch the starter pinion, and a switching winding that provides an induced voltage, the voltage being induced by the engagement winding of the starter relay, wherein, the induced voltage of the switching winding relates to possible pinion positions and wherein a voltage difference in the switching winding indicates that the pinion is engaged, and in addition an actuator is provided for starting the starter motor, the actuator bringing about the starting as a function of the detected position of the starter pinion.

* * * * *